United States Patent [19]
Luthi

[11] Patent Number: 5,683,582
[45] Date of Patent: Nov. 4, 1997

[54] AIR INFLOW RESTRICTOR FOR VACUUM FILTERS

[75] Inventor: Oscar Luthi, Nashua, N.H.

[73] Assignee: Beloit Technologies, Inc., Wilmington, Del.

[21] Appl. No.: 590,969

[22] Filed: Jan. 24, 1996

[51] Int. Cl.[6] .................................................. B01D 33/06
[52] U.S. Cl. ........................ 210/404; 210/416.1; 210/429
[58] Field of Search ............................. 210/390, 402, 210/404, 406, 416.1, 418, 429, 430; 251/208; 137/625.41, 627, 625.46; 406/52, 62, 65, 68

[56] References Cited

U.S. PATENT DOCUMENTS

| | | | |
|---|---|---|---|
| 1,757,355 | 5/1930 | Benjamin et al. | 210/331 |
| 3,233,736 | 2/1966 | Vernay | 210/404 |
| 3,363,774 | 1/1968 | Luthi | 210/404 |
| 3,902,960 | 9/1975 | Zentner et al. | 210/402 |
| 4,057,373 | 11/1977 | Schwing | 137/625.46 |
| 4,223,700 | 9/1980 | Jones | 137/625.46 |
| 4,608,171 | 8/1986 | La Valley | 210/404 |
| 4,683,059 | 7/1987 | Lavalley | 210/404 |
| 5,053,123 | 10/1991 | Clarke-Pounder et al. | 210/138 |
| 5,264,138 | 11/1993 | Heino et al. | 210/784 |
| 5,501,552 | 3/1996 | Simkawski | 406/52 |
| 5,503,737 | 4/1996 | Luthi | 210/138 |

Primary Examiner—Neil McCarthy
Assistant Examiner—Theodore M. Green
Attorney, Agent, or Firm—Dirk J. Veneman; Raymond W. Campbell

[57] ABSTRACT

A rotary drum filter valve is provided with a valve having a valve segment with a first part which partially restricts the flow of filtrate from a head section and a second part which blocks from the head section.

19 Claims, 6 Drawing Sheets

AIR INFLOW RESTRICTOR FOR VACUUM FILTERS

BACKGROUND OF THE INVENTION

This invention relates generally to valves for vacuum filters and more particularly to a vacuum filter valve which incorporates a feature selectively restricting the flow of filtrate from the pulp slurry.

Vacuum filters are used extensively in the pulp industry to dewater and wash pulp. Pulp at low consistency, approximately 1%, is dewatered to 12–18% (sometimes higher) and then washed by a bank of showers. Many different internal designs are used to pipe away the filtrate via a valve and a barometric leg. Problems have been experienced with low vacuum on filters on free-draining stock and especially on filters having end-draining flow channels. A high elbow vacuum is more important on highly loaded machines because the elbow vacuum is not only used to accumulate the pulp mat, but is also used for transporting the filtrate from under the deck to the valve, i.e., a high pressure drop in the filtrate channel leaves very little vacuum for filtration. This lowers the capacity of the machine and results in lower discharge consistency thereby affecting the washing efficiency.

A typical end draining machine is shown in FIG. 1. Prior to emergence, the drainage and head section channels 18, 16 are full of filtrate. The end drainage velocity is still quite high, as shown in FIG. 2. The end drainage velocity changes from 13.72 ft/s at submergence to 6.58 ft/w at emergence. The vacuum under the deck increases slowly from zero to a maximum of 7.858" Hg. with an elbow vacuum of 10" Hg. The difference in the vacuum is used for fluid friction and acceleration.

After emergence, the end velocity is maintained or even increased because of lower flow resistance of air through the pulp mat, but even at the same end velocity, the flow channel would be completely empty in 2.4 seconds or 36° arc for the assumed drum speed of 2.5 rpm. As shown in FIG. 1, even a partially empty head and flow channel would allow air to bypass the filtrate and flow freely down the barometric leg, thus reducing vacuum. As shown in FIG. 3, even at the 12 o'clock position, air can be drawn through the valve into the barometric leg.

Some machines, known as pipe machines, have drainage from the center of the flow channel with pipes leading to the valve. Air cannot readily bypass the filtrate in a pipe machine. The pipes would have to be completely empty for air to be drawn through the valve. Although this is possible, it is less likely to occur since filtrate is constantly resupplied from both halves of the deck, as shown in FIG. 5.

The foregoing illustrates limitations known to exist in present vacuum filters. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention increased vacuum efficiency is accomplished by providing a valve for a rotary drum filter comprising: a hollow valve body having one end essentially open for receiving filtrate collected in segmented channels radially disposed about the center of a filter shaft, the segmented channels receiving filtrate from flow channels circumferentially distributed about a surface of the drum filter; a chamber formed within said valve body for receiving said filtrate; a vacuum means in communication with said chamber for withdrawing collected filtrate from said chamber; and a restriction means for restricting the flow of filtrate from the segmented channels, the restriction means having a first portion for partially restricting the flow of filtrate and a second portion for preventing the flow of filtrate.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
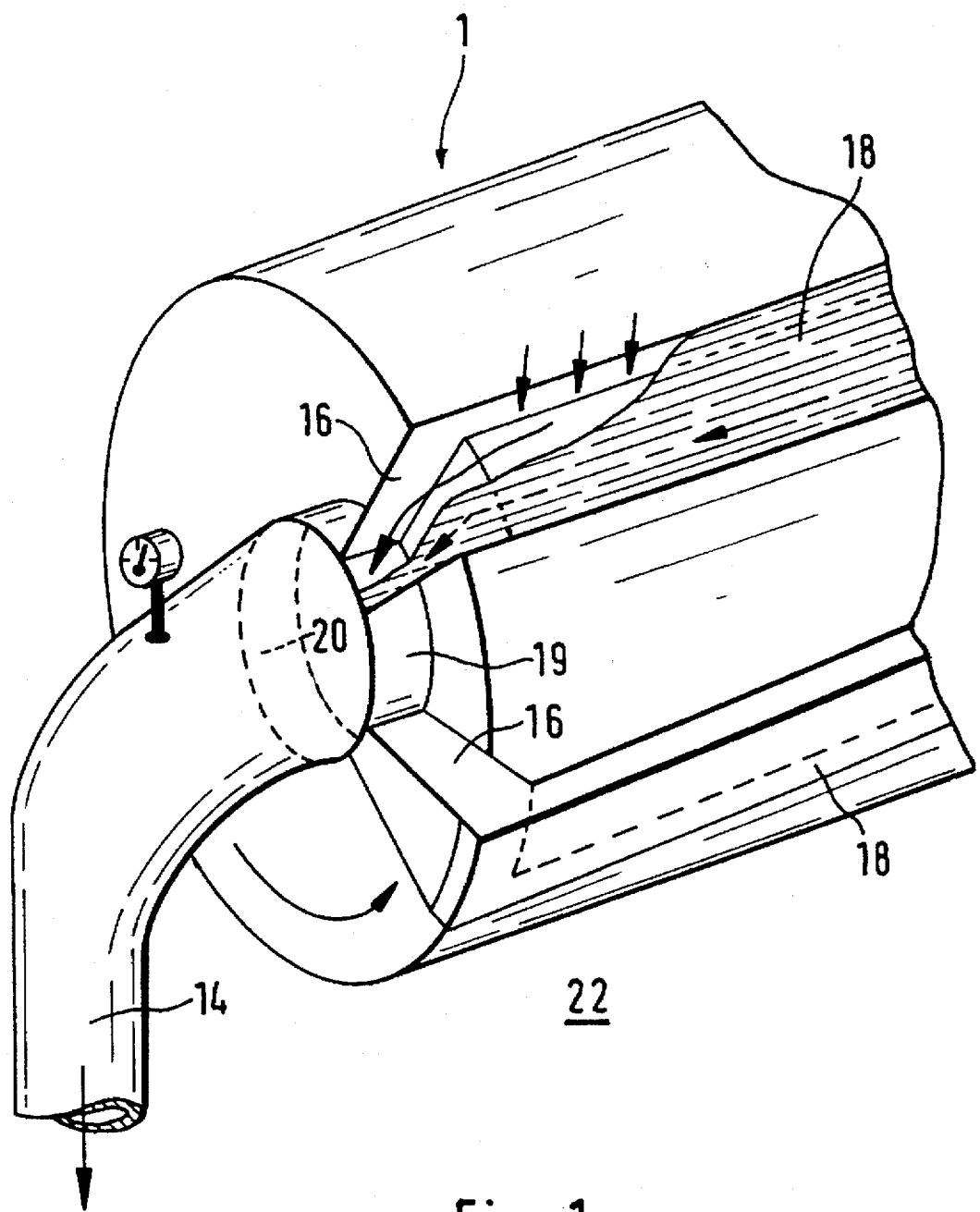
FIG. 1 is an isometric view of a vacuum filter according to the prior art.
Figure 2:
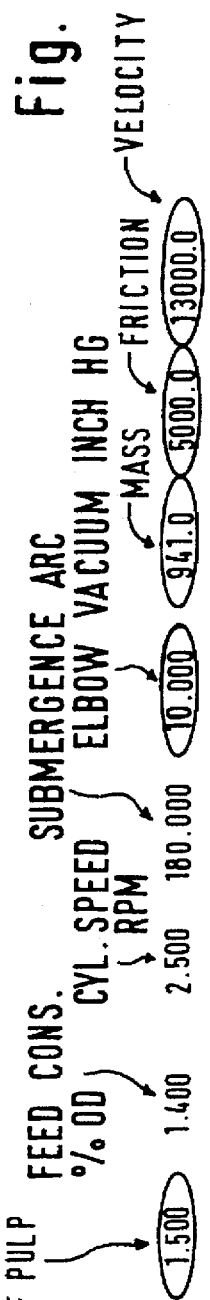
FIG. 2 is a table listing some process parameters for a typical vacuum filter.
Figure 3:
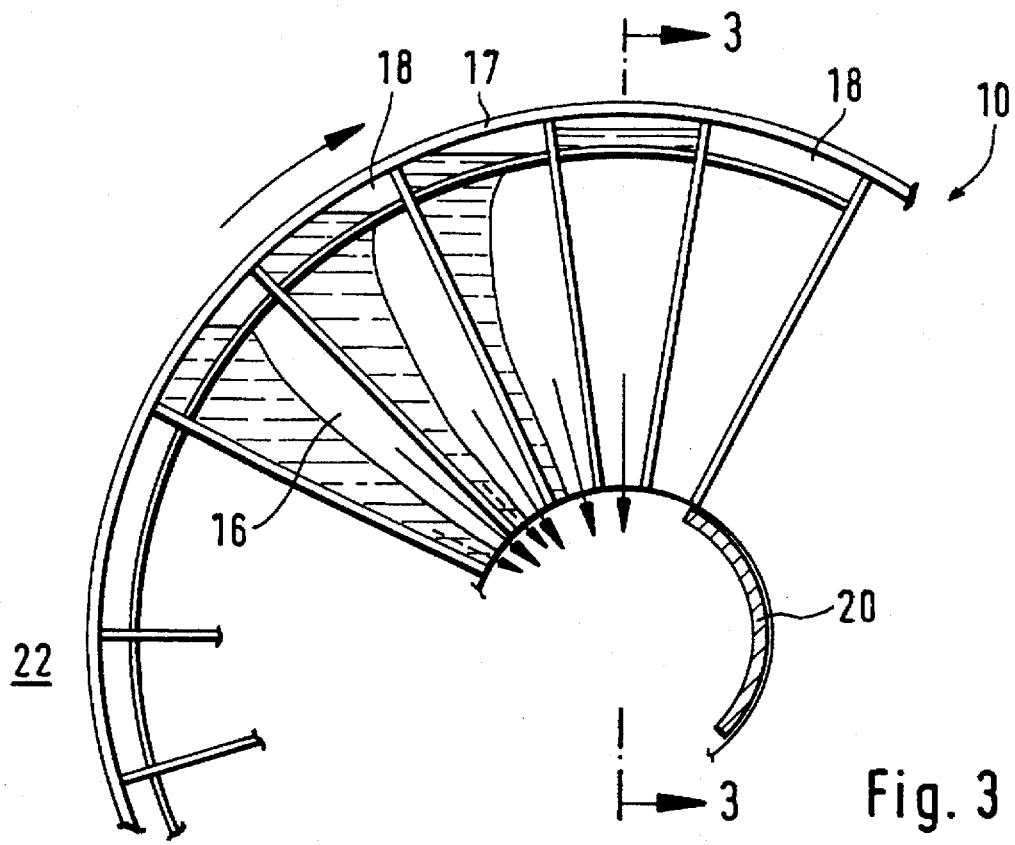
FIG. 3 is a cross-section of a prior art vacuum filter.
Figure 4:
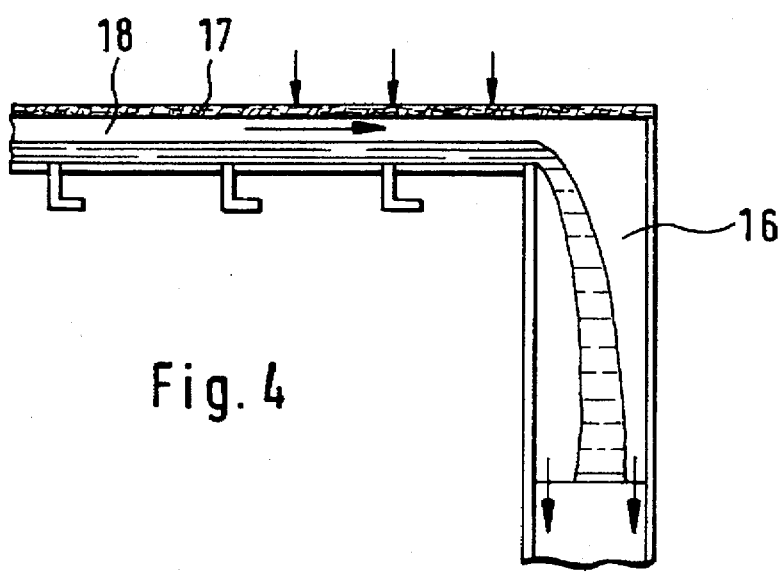
FIG. 4 is a cross-section of FIG. 3, taken on line 3—3.
Figure 5:
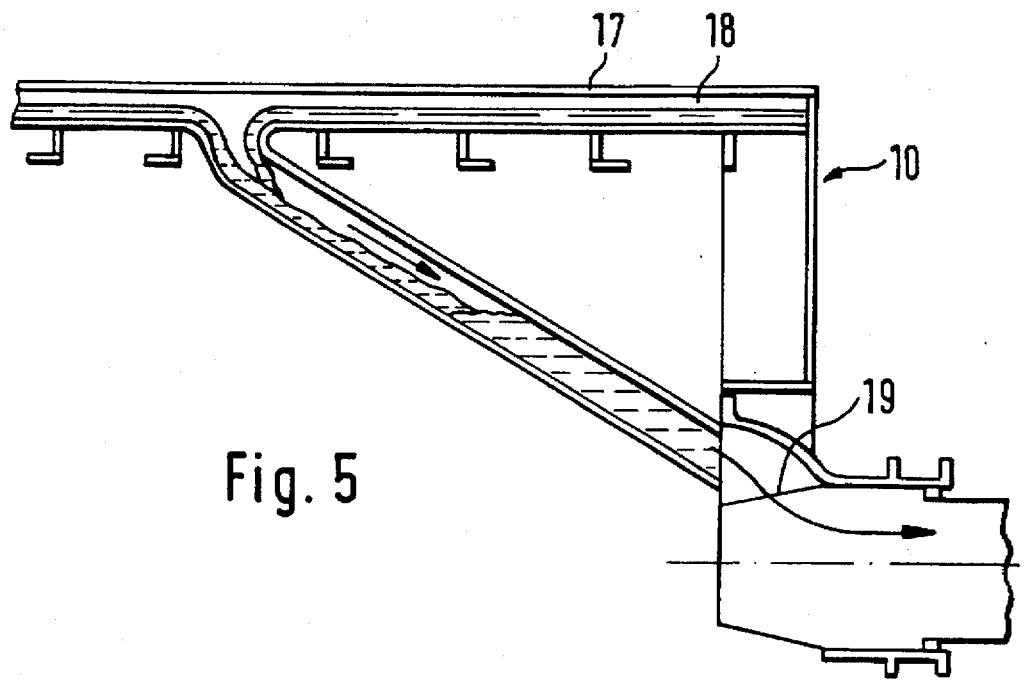
FIG. 5 is partial cross-section of a prior art "pipe" machine vacuum filters

Referring to FIGS. 1, 3 and 4, a conventional pulp vacuum filter is shown and generally designated by the reference numeral 1. Fibrous pulp material 22 is fed into a filter vat. In typical operation the vat is filled to slightly over center level of the rotating shaft. Filtration is accomplished by rotating the drum 10. This takes the deck 12 of the drum 10 through a sector wherein the deck 12 is submerged in the pulp and through a sector wherein the pulp that is filtered and formed on the filtering surfaces of the desk 12 is stripped by scraper or doctor means or the like (not shown) from the screen like filtering surface. The stripped pulp is collected in discharge troughs or chutes through which the filtered pulp exits the filter 1. The drum 10 has a plurality of flow channels 18 under deck 12 about the circumferential surface of the drum 10. These flow channels 18 conduct filtrate to corresponding head sections 16. From the head sections 16, the filtrate passes through a valve 19 into a barometric leg 14 where a vacuum is maintained.

To better understand the nature of the present invention it is desirable to understand the sequence of filtration and fiber mat formation. In referring to FIG. 1, as previously stated, pulp is fed into the vat wherein a level of approximately half or greater of the diameter of the drum 10 is maintained. Taking the sequence from just before the deck 12 enters the pulp and considering counter-clockwise rotation as viewed in FIG. 1, a fiber mat forms on the filtering surface of the deck 12 as it begins to submerge. At some optimum time after complete submergence of the deck 12, vacuum is applied to induce a greater pressure differential across the initially formed pulp mat. This promotes more filtrate to be drawn through the mat while at the same time increasing the deposit of more fibers on the mat. The fiber mat is further dewatered by the vacuum until the vacuum is cutoff by valve 19. Valve 19 includes a valve segment 20 which blocks or cuts off the vacuum. The valve segment 20 (as shown in FIG. 3) extends from approximately mately 1 o'clock to 5 o'clock. The deck 12 then reaches the take-off scraper or doctor (not shown) which cuts the mat loose from the filtration media and allows the mat to peel off and fall into the mat discharge chute.

One solution to low vacuum in vacuum filters is the restriction of flow by the valve in the drying/wash zone to dam up the filtrate in the head section 16 to prevent the air from bypassing the filtrate. The remaining valve opening should be big enough to drain the wash liquor and to dry the pulp but, but should not big enough for air to bypass the liquor.

For vacuum washers having louvered decks, it is preferable that not all the liquor is drained out of the flow channels. The louvered decks will trap the remaining liquor. Any remaining liquor in the deck section does not have to be refilled in the next cycle.

Figure 6:
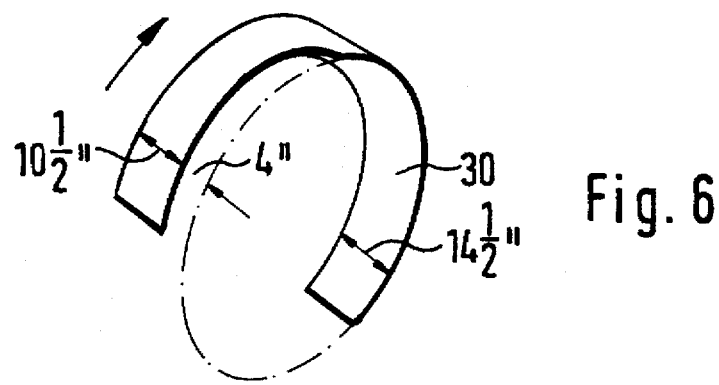
FIG. 6 is perspective view of one embodiment of an axial valve segment.
Figure 6A:
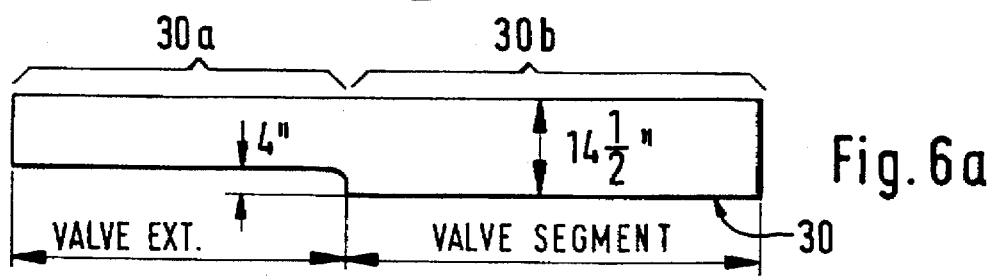
FIG. 6A is a planar projection of the axial valve segment shown in FIG. 6.

One embodiment of an axial valve segment 30 is shown in FIGS. 6 and 6A. The valve segment 30 is divided into two portions, a partial restriction portion 30a and a full closure portion 30b. As the drum 10 rotates, the sectors of the drum emerge from the pulp slurry 22. At the point of emergence, the head section 16 and the corresponding flow channel 18 are connected to the full vacuum of the barometric leg 14. The flow of filtrate into the barometric leg 14 is full and unimpeded. As the drum 10 continues to rotate, the head section 16 encounters the partial restriction portion 30a of valve segment 30. This partial restriction of the filtrate flow into the barometric leg 14 impedes the flow of filtrate out of the head section 16 and causes the filtrate flow to be dammed up. This partial damming of the filtrate flow helps to prevent the air from bypassing the filtrate and thereby prevents the vacuum from being unnecessarily reduced due to air flow rather than filtrate flow. As the drum 10 continues to rotate, the head section 16 then encounters the full closure portion 30b of the valve segment 30 which closes the head section 16 off from the vacuum in the barometric leg. Preferably, the partial restriction portion 30a extends from 10 o'clock to approximately 1 o'clock, where complete vacuum cut-off occurs.

Figure 6B:
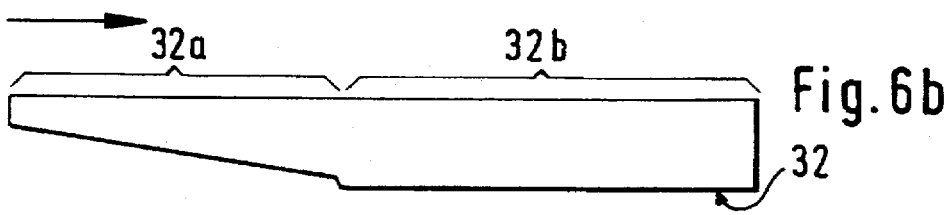
FIG. 6B is a planar projection of a further embodiment of an axial valve segment.

An alternate embodiment of the valve segment 32 is shown in FIG. 6B. This embodiment has a tapered partial restriction portion 32a and a full restriction portion 32b.

Figure 7:
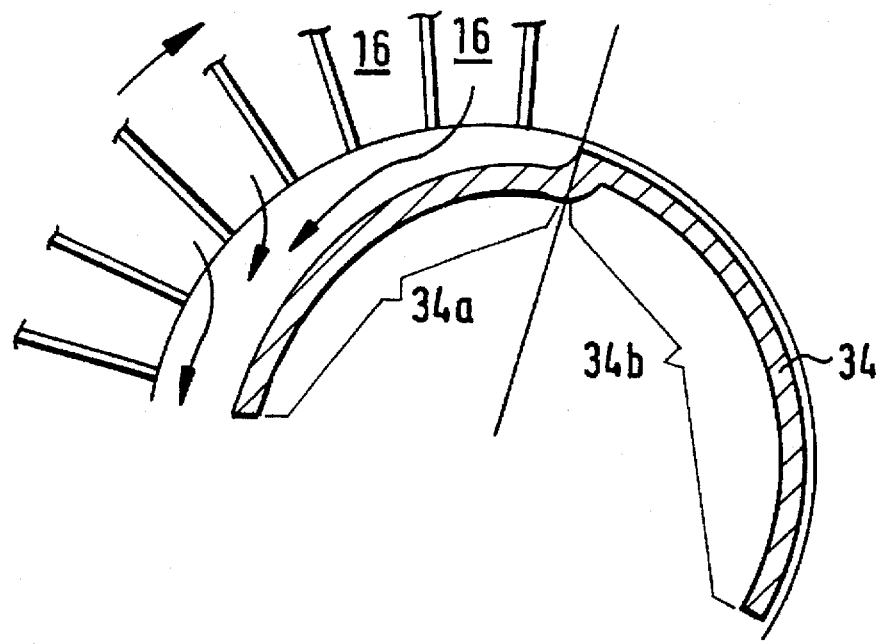
FIG. 7 is a cross-sectional view of one embodiment of a radial valve segment.
Figure 8:
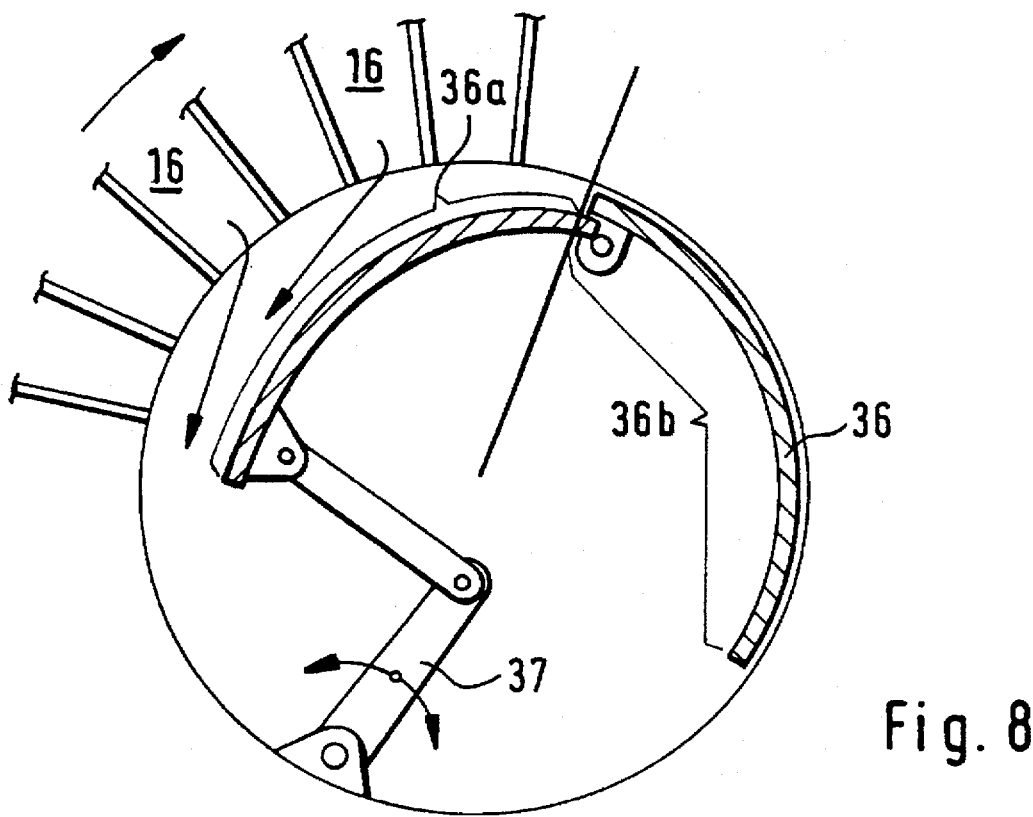
FIG. 8 is a cross-sectional view of one embodiment of an adjustable radial valve segment.

Two embodiments of radial valve segments 34, 36 are shown in FIGS. 7 and 8. In these embodiments, the flow of filtrate is dammed up or restricted by a partial restriction portion 34a, 36a which is offset a varying distance radially from the exit of the head sections 16 and the full closure portion 34b, 36b closes off the head section 16. The embodiment in FIG. 8 has an adjustment apparatus 37 which allows the radial offset of the partial restriction portion 36a to be externally adjusted or varied.

Figure 9:
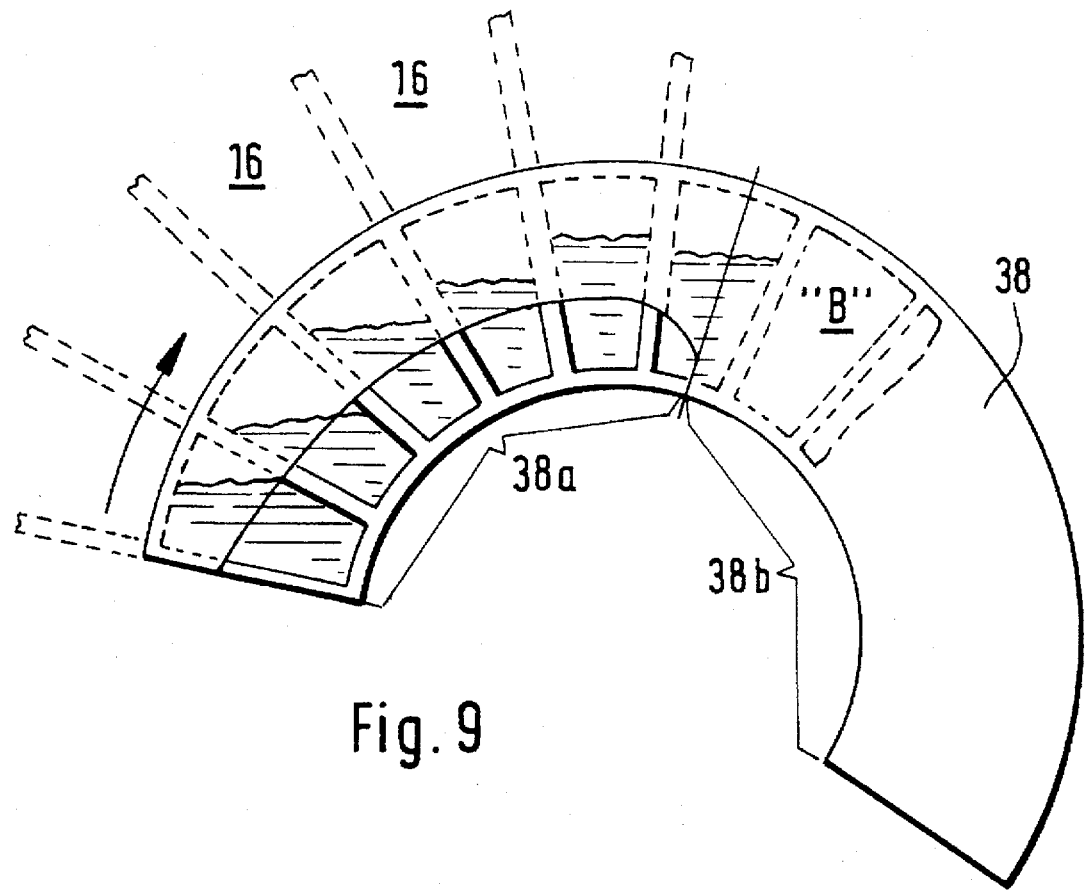
FIG. 9 is an end view of an embodiment of a flat valve with a radial valve segment.
Figure 10:
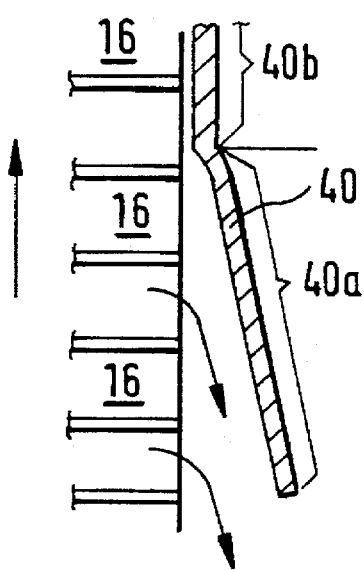
FIG. 10 is cross-sectional view of an embodiment of a flat valve with an axial valve segment.

A further embodiment of a flat valve segment 38 with a radially varying partial restriction portion 38a is shown in FIG. 9. This valve segment 38 could be used in a conical valve or a valve in which the flow from the head sections 16 is axial rather than radial. In this embodiment, the partial restriction portion 38a radially restricts the opening of the head sections 16 to the barometric leg 14. Preferably, as shown, the amount of restriction varies as the head sections 16 approach the complete vacuum portion 38b of the valve segment 38. Another embodiment of a valve segment 40, for use with a vacuum filter i where the flow from the head sections 16 into the barometric leg 14 is also axial, is shown in FIG. 10. In this embodiment, the partial restriction portion 40a restricts the filtrate flow by damming the flow up behind the valve segment portion 40a and the full closure portion 40b closes off the head section 16. The partial segment portion 40a may also be hinged or otherwise adjustable.

What is claimed is:

1. A valve for a rotary drum filter comprising:
   a hollow valve body having one end for receiving filtrate collected in segmented channels radially disposed about the center of a filter shaft, the segmented channels receiving filtrate from flow channels circumferentially distributed about a surface of the drum filter;
   a chamber formed within said valve body for receiving said filtrate;
   a vacuum means in communication with said chamber for withdrawing collected filtrate from said chamber; and
   a restriction means, within said chamber, for restricting the flow of filtrate from the segmented channels, the restriction means comprising a first portion for partially restricting the flow of filtrate, the first portion comprising a first axially extending width and a second portion for preventing the flow of filtrate, the second, portion having a second axially extending width, the first axially extending width being less than the second axially extending width.

2. The valve according to claim 1, wherein the first axially extending width is constant.

3. The valve according to claim 1, wherein the first axially width varies from a maximum width proximate the second portion to a minimum width at a free end of the first portion, the free end of the first portion being distal from the second portion.

4. The valve according to claim 1, wherein the first portion comprises a plurality of perforations.

5. A valve for a rotary drum filter comprising:
   a hollow valve body having one end for receiving filtrate collected in segmented channels radially disposed about the center of a filter shaft, the segmented channels receiving filtrate from flow channels circumferentially distributed about a surface of the drum filter;
   a chamber formed within said valve body for receiving said filtrate;
   a vacuum means in communication with said chamber for withdrawing collected filtrate from said chamber; and
   a restriction means comprising a curved plate, within said chamber, for restricting the flow of filtrate from the segmented channels, the curved plate comprising a first portion for partially restricting the flow of filtrate and a second portion for preventing the flow of filtrate,
   wherein the first portion has a first radius and the second portion has a second radius, the first radius being less than the second radius, the first radius varying from a maximum radius proximate the second portion to a minimum radius at a free end of the first portion, the free end of the first portion being distal from the second portion.

6. A valve for a rotary drum filter comprising:
   a hollow valve body having one end for receiving filtrate collected in segmented channels radially disposed about the center of a filter shaft, the segmented channels receiving filtrate from flow channels circumferentially distributed about a surface of the drum filter;

a chamber formed within said valve body for receiving said filtrate;

a vacuum means in communication with said chamber for withdrawing collected filtrate from said chamber; and a restriction means, within said chamber, for restricting the flow of filtrate from the segmented channels, the restriction means having a first portion for partially restricting the flow of filtrate and a second portion for preventing the flow of filtrate, wherein the second portion is a curved plate and the first portion is a curved plate moveably connected to an end of the second portion, the valve further comprising a means for adjusting the radial position of the first portion.

7. A valve for a rotary drum filter comprising:

a hollow valve body having one end for receiving filtrate collected in segmented channels radially disposed about the center of a filter shaft, the segmented channels receiving filtrate from flow channels circumferentially distributed about a surface of the drum filter;

a chamber formed within said valve body for receiving said filtrate;

a vacuum means in communication with said chamber for withdrawing collected filtrate from said chamber; and a restriction means, within said chamber, for restricting the flow of filtrate from the segmented channels, the restriction means having a first portion for partially restricting the flow of filtrate and a second portion for preventing the flow of filtrate, wherein said restriction means further comprises a partial annular disk shaped plate which subtends less than 360 degrees, the first portion having a first radially extending width, the second portion having a second radially extending width, the first radially extending width being less than the second radially extending width.

8. A valve for a rotary drum filter comprising:

a hollow valve body having one end for receiving filtrate collected in segmented channels radially disposed about the center of a filter shaft, the segmented channels receiving filtrate from flow channels circumferentially distributed about a surface of the drum filter;

a chamber formed within said valve body for receiving said filtrate;

a vacuum means in communication with said chamber for withdrawing collected filtrate from said chamber; and a restriction means, within said chamber, for restricting the flow of filtrate from the segmented channels, the restriction means having a first portion for partially restricting the flow of filtrate and a second portion for preventing the flow of filtrate, wherein said restriction means further comprises a partial annular disk shaped plate which subtends less than 360 degrees, the axis of the disk shaped plate being coincident with the axis of the drum filter, the second portion being adjacent to an outlet portion of said segmented channels, the first portion being axially offset from said second portion.

9. The valve according to claim 8, wherein said first portion is moveably attached to an end of said second portion; and further comprising a means for adjusting the axial offset of said first portion.

10. A rotary drum filter assembly comprising:

a drum filter mounted onto rotating filter shaft, the drum filter comprising a plurality of segmented channels extending radially between the filter shaft and an outer periphery of the drum, the segmented channels communicating filtrate passing radially inward from the outer periphery of the drum to a restriction valve disposed at one end of the drum filter, the valve comprising a hollow valve body for receiving filtrate, the valve body being in communication with a vacuum disposed opposite the valve body from the drum filter, the valve body accommodating a restricting valve segment for restricting the radially inward flow of filtrate from the segmented channels through the valve body, the restricting valve segment comprising a first portion for partially restricting the radially inward flow of filtrate and a second portion for preventing the radially inward flow of filtrate.

11. The rotary drum filter assembly of claim 10, wherein the restricting valve segment is a curved plate, the first portion having a first axially extending width, the second portion having a second axially extending width, the first axially extending width being less than the second axially extending width.

12. The rotary drum filter assembly of claim 11, wherein the first axially extending width is constant.

13. The rotary drum filter assembly of claim 11, wherein the first axially extending width varies from a maximum width proximate to the second portion to a minimum width at a free end of the first portion, the free end of the first portion being distal from the second portion.

14. The rotary drum filter assembly of claim 10, wherein the first portion comprises a plurality of perforations.

15. The rotary drum filter assembly of claim 10, wherein the restricting valve segment comprises a curved plate wherein the first portion has a first radius and the second portion has a second radius, the first radius being less than the second radius, the first radius varying from a maximum radius proximate the second portion to a minimum radius at a free end of the first portion, the free end of the first portion being distal from the second portion.

16. The rotary drum filter assembly of claim 10, wherein the second portion is a curved plate and the first portion is a curved plate movably connected to an end of the second portion, the assembly further comprising a means for adjusting the radial position of the first portion.

17. The rotary drum filter assembly of claim 10, wherein the restricting valve segment further comprises a partial annular disk shaped plate which subtends less than 360 degrees, the first portion having a first radially extending width, the second portion having a second radially extending width, the first radially extending width being less than the second radially extending width.

18. The rotary drum filter assembly of claim 10, wherein the restricting valve segment further comprises a partial annular diskm shaped plate which subtends less than 369 degrees, the axis of the disk shaped plate being coaxial with the axis of the rotating filter shaft, the second portion being adjacent to an outlet portion of the segmented channels, the first portion being axially offset from said second portion.

19. The rotary drum filter assembly of claim 18, wherein said first portion is movably attached to an end of said second portion, the assembly further comprising a means for adjusting the axial offset of said first portion.

* * * * *